United States Patent [19]

Niwa et al.

[11] Patent Number: 5,541,269
[45] Date of Patent: Jul. 30, 1996

[54] METHOD FOR DRYING VAPOR PHASE REACTION SYSTEM

[75] Inventors: Masahiro Niwa, Yokohama; Shinjiro Suga, Kawasaki; Mamoru Yoshikawa, Kawasaki; Yoshihisa Yamaguchi, Kawasaki, all of Japan

[73] Assignee: Nippon Petrochemicals Company, Limited, Tokyo, Japan

[21] Appl. No.: 174,270

[22] Filed: Dec. 28, 1993

[30] Foreign Application Priority Data

Dec. 29, 1992 [JP] Japan .................. 4-360309

[51] Int. Cl.⁶ .......................................... C08F 2/34
[52] U.S. Cl. ..................... 526/62; 526/348; 526/901
[58] Field of Search ..................... 526/62, 901, 348

[56] References Cited

U.S. PATENT DOCUMENTS

| | | | |
|---|---|---|---|
| 3,708,465 | 1/1973 | Dietrich et al. | 526/84 |
| 4,035,560 | 7/1977 | Caumartin et al. | 526/124 |
| 4,326,048 | 4/1982 | Stevens et al. | 526/68 |
| 4,532,311 | 7/1985 | Fulks et al. | 526/62 |
| 5,077,358 | 12/1991 | Durand et al. | 526/125 |

FOREIGN PATENT DOCUMENTS

| | | |
|---|---|---|
| 0099660A1 | 2/1984 | European Pat. Off. . |
| 0136029A2 | 4/1985 | European Pat. Off. . |
| 0313087A1 | 4/1989 | European Pat. Off. . |
| 0315192A1 | 5/1989 | European Pat. Off. . |
| 0366823A1 | 5/1990 | European Pat. Off. . |
| 0407143A2 | 1/1991 | European Pat. Off. . |
| 0413469A2 | 2/1991 | European Pat. Off. . |
| 0428375A2 | 5/1991 | European Pat. Off. . |
| 0471497A1 | 2/1992 | European Pat. Off. . |
| 0493118A2 | 7/1992 | European Pat. Off. . |
| 0500392A2 | 8/1992 | European Pat. Off. . |
| 0507574A2 | 10/1992 | European Pat. Off. . |
| 0534405A1 | 3/1993 | European Pat. Off. . |
| 2075128 | 10/1971 | France . |
| 2312512 | 12/1976 | France . |

*Primary Examiner*—Thomas R. Weber
*Attorney, Agent, or Firm*—Fisher, Christen & Sabol

[57] ABSTRACT

In the polymerization of olefins using a catalyst comprising an organoaluminum compound and solid catalyst components containing titanium and/or vanadium; and magnesium in a vapor phase fluidized bed, the formation of sheet-like polymer and other abnormal conditions in the initial stage of the polymerization are avoided by means of previous drying of the reactor by feeding an organoaluminum compound prior to the feeding of seed polymer, the quantity of said organoaluminum compound being calculated by the following equation (I):

$$A = k \cdot V^{2/3} \qquad (I)$$

wherein A is the feed quantity (mol) of the organoaluminum compound, k is a coefficient (mol/m²) in the range from 0.15 to 4, and V is the volume (m³) of the whole system including gas circulation pipings.

10 Claims, No Drawings

METHOD FOR DRYING VAPOR PHASE REACTION SYSTEM

BACKGROUND OF THE INVENTION (1) Field of the invention

This invention relates to a method for operating the process for polymerizing olefins in a vapor phase process. More particularly, the invention relates to a method for starting the operation so as to reduce the formation of sheet-like polymer and to avoid the unstable reaction in the initial stage of the process of polymerization or copolymerization of α-olefins in a vapor phase fluidized bed.

(2) Description of Prior Art

When the polymerization of α-olefins is carried out in a vapor phase fluidized bed, the formation of sheet-like polymer is liable to occur in the initial stage of the polymerization and the sheet-like polymer blocks up the outlet for polymer product and other parts such as pipings in the downstream side. The blocking sometimes makes the operation substantially impossible to be continued.

The formation of sheet-like polymer is liable to occur during the period from the feeding of a catalyst into a reaction vessel before the polymerization to the stage in which a certain quantity of polymer is produced. The sheet-like polymer is seldom formed during the regular or steady-state reaction after the initial state.

Accordingly, it is considered that the formation of sheet-like polymer is caused by the differences in some conditions between: (a) the period between the initial starting stage and (b) the conditions in the regular reaction state of the polymerization system.

In the initial stage of polymerization, it is undesirable that not only is sheet-like polymer formed but also that unstable polymerization conditions are caused to occur. Especially, the bulk density of the polymer obtained in the initial stage is low as compared with the bulk density of the product obtained in the regular reaction state.

In the polymerization using a vapor phase fluidized bed, one of the factors which influences productivity is the bulk density of polymer produced. The productivity is determined by the weight of polymer produced per unit time with a reactor of a certain volume. Therefore, when the bulk density of the polymer is increased, the productivity can be improved. Accordingly, it is desirable to maintain the same higher bulk density from the initial stage to and through the regular or steady state period of the polymerization.

Furthermore, polymer products are taken out from a reactor intermittently and the volume of polymer to be taken out each time is predetermined. In the case that the bulk density of a polymer is low, the quantity of polymer particles in the discharged gases is small. Therefore, the volume of the entrained gases discharged together with the polymer of a certain quantity is increased. The entrained gases consist of unreacted gases including nitrogen and ethylene. It is not advantageous in view of economy to recover the ethylene by separating it from said unreacted gases. Therefore, if it is possible to make the bulk density of polymer product in the initial stage as large as the value in the regular reaction state, the quantity of the above-mentioned entrained unreacted gases can be reduced and the process can be improved in view of economy and production efficiency.

As described above, the productivity and economy can be improved by avoiding the lowering of the bulk density of polymer produced in the initial stage of polymerization.

Furthermore, even when hydrogen gas is fed in a predetermined gas ratio in the initial stage of polymerization, the melt flow rate (MFR) of polymer is sometimes different from the MFR value of the polymer obtained in the regular or steady-state period. In other words, it is observed that the function of hydrogen to regulate the molecular weight is abnormal.

When such a phenomenon is caused to occur, the production of a polymer having predetermined properties is substantially difficult. In such a case, trial and error operation must be repeated by changing the gas composition, measuring the changed value in MFR of obtained polymer and feeding the value back to the gas composition. In the case of a vapor phase fluidized bed, however, it takes many hours for all the polymer to be replaced by a new polymer within a reaction vessel because the residence time of the polymer particles is generally as long as several hours.

Accordingly, if the value of MFR can be maintained at a normal value in the initial stage of polymerization, the normal state production can be started producing neither off-standard product nor second-grade product.

BRIEF SUMMARY OF THE INVENTION

The object of the present invention is, therefore, to provide a novel method for operating at a high productivity by settling the problem of the formation of sheet-like polymer and the lowering of the bulk density and MFR value of produced polymer.

In view of the above object, the inventors of the present invention have carried out extensive investigations. As a result, the present invention has been accomplished with the findings that, before feeding seed polymer particles into a reactor in the initial stage of polymerization: (1) the formation of sheet-like polymer can be suppressed, and (2) the deviation of the polymerization state from the regular state condition can also be avoided by drying the reaction system in a reactor by feeding it with only an organoaluminum compound. The organoaluminum compound is generally used in combination with the solid catalyst components in the regular polymerization state.

Accordingly, the present invention provides a method for drying a vapor phase reaction system which is characterized in that, in a method for polymerizing or copolymerizing olefins in a vapor phase condition in the presence of a catalyst comprising an organoaluminum compound and solid catalyst components containing at least one or both of titanium and vanadium and magnesium, the drying is carried out by feeding an organoaluminum compound in the quantity as defined by the equation (I) into the reactor before seed polymer particles are fed to said reactor, $$A = k \cdot V^{2/3} \qquad (I)$$

wherein A is the feed quantity (mol) of organoaluminum compound, k is a coefficient (mol/m2) in the range from 0.15 to 4, and V is the volume (m3) of the whole polymerization system including gas circulation pipings.

DETAILED DESCRIPTION OF THE INVENTION

The present invention will be described in more detail in the following.

The reactor used for the polymerization or copolymerization of olefins in a vapor phase condition substantially includes all of those used for the operation in a fluidized bed system, a stirred bed system or in a gas-solid system, in which the use of a stirrer is optional.

The olefins used in the present invention have 2 to 8 carbon atoms, preferably 2 to 6 carbon atoms. For example, α-olefins such as ethylene, propylene, butene-1, pentene-1, hexene-1, and 4-methylpentene-1 are used. These olefins can be used singly for homopolymerization or for copolymerization of two or more kinds of them. The combinations of monomers for copolymerization are exemplified by those of ethylene and an α-olefin having 3 to 12 carbon atoms such as ethylene/propylene, ethylene/butene-1, ethylene/hexene-1, and ethylene/4-methylpentene-1; propylene/butene-1; and the combination of ethylene and two kinds or more of α-olefins. Furthermore, it is possible to copolymerize with dienes for the purpose to improve the properties of polyolefin. Exemplary of the dienes are butadiene, 1,4-hexadiene, ethylidenenorbornene, and dicyclopentadiene.

The feeding of olefins into the reaction system is preferably carried out together with a suitable inert carrier gas such as nitrogen.

The catalysts used for the above polymerization of olefins are composed of an organoaluminum compound and solid catalyst components which contain at least one or both of titanium and vanadium and magnesium. The solid catalyst components containing at least titanium and/or vanadium; and magnesium are exemplified by a catalyst component containing titanium and magnesium which is well known as a Ziegler type catalyst for the polymerization of olefins, a catalyst component containing vanadium and magnesium, and a catalyst component containing titanium, vanadium and magnesium.

More particularly, the above catalyst components are prepared by adding a titanium compound and/or vanadium compound on a carrier of magnesium-containing inorganic solid compounds such as metallic magnesium, magnesium hydroxide, magnesium carbonate, magnesium oxide, and magnesium chloride, or double salts, double oxides, carbonates, chlorides and hydroxides containing magnesium and an element selected from silicon, aluminum, and calcium, or those obtained by treating or reacting the above inorganic solid compounds with an oxygen-containing compound, sulfur-containing compound, aromatic hydrocarbon or halogen-containing compound.

The above-mentioned oxygen-containing compounds are exemplified by water; polysiloxane; organic oxygen-containing compounds such as alcohols, phenols, ketones, aldehydes, carboxylic acids, esters, and acid amides; alkoxides of metals; and inorganic oxygen-containing compounds such as oxychlorides of metals. The sulfur containing compounds are exemplified by organic sulfur-containing compounds such as thiols and thioethers and inorganic sulfur-containing compounds such as sulfur dioxide, sulfur trioxide, and sulfuric acid. The aromatic hydrocarbons are exemplified by monocyclic or polycyclic aromatic hydrocarbons such as benzene, toluene, xylene, anthracene, and phenanthrene. The halogen-containing compounds are exemplified by chlorine, hydrogen chloride, metal chlorides, and organic halides.

The foregoing titanium compounds are exemplified by halides, alkoxy halides, alkoxides, and oxychlorides of titanium. Among them, tetra-valent titanium compounds and tri-valent titanium compounds are preferably used. The tetra-valent titanium compounds are represented by the general formula:

$$Ti(OR)_n X_{4-n}$$

in which R is a hydrocarbon radical such as an alkyl group, aryl group or aralkyl group having 1 to 20 carbon atoms, X is a halogen atom and n is a numeral of $0 \leq n \leq 4$.

More particularly, the titanium compounds are exemplified by titanium tetrachloride, titanium tetrabromide, titanium tetraiodide, trichlorotitanium monomethoxide, dichlorotitanium dimethoxide, monochlorotitanium trimethoxide, titanium tetramethoxide, trichlorotitanium monoethoxide, dichlorotitanium diethoxide, monochlorotitanium triethoxide, titanium tetraethoxide, trichlorotitanium monoisopropoxide, dichlorotitanium diisopropoxide, monochlorotitanium triisopropoxide, titanium tetraisopropoxide, trichlorotitanium monobutoxide, dichlorotitanium dibutoxide, monochlorotitanium tributoxide, titanium tetrabutoxide, trichlorotitanium monopentoxide, trichlorotitanium monophenoxide, dichlorotitanium diphenoxide, monochlorotitanium triphenoxide, and titanium tetraphenoxide.

The tri-valent titanium compounds are represented by the general formula:

$$Ti(OR)_m X_{4-m}$$

in which R is a hydrocarbon radical such as an alkyl group, aryl group or aralkyl group having 1 to 20 carbon atoms, X is a halogen atom and m is a numeral of $0<m<4$. These compounds are exemplified by tri-valent titanium compounds which are prepared by reducing halogenated titanium alkoxides with hydrogen, aluminum, titanium or organometallic compounds of the group I to III of the periodic table.

Among the above titanium compounds, the tetravalent titanium compounds are preferable.

More particularly, the catalysts are exemplified by those prepared by combining organoaluminum compounds with solid catalyst components of:

MgO—RX—TiCl$_4$ (U.S. Pat. No. 4,065,611),

Mg—SiCl$_4$—ROH—TiCl$_4$,

MgCl$_2$—Al(OR)$_3$—TiCl$_4$ (U.S. Pat. No. 4,202,953),

MgCl$_2$—SiCl$_4$—ROH—TiCl$_4$ (U.S. Pat. Nos. 4,006,101 and 4,083,802)

Mg(OOCR)$_2$—Al(OR)$_3$—TiCl$_4$ (U.S. Pat. No. 4,022,958),

Mg—POCl$_3$—TiCl$_4$,

MgCl$_2$—AlOCl—TiCl$_4$ (U.S. Pat. No. 4,061,857),

MgCl$_2$—Al(OR)$_n$X$_{3-n}$—Si(OR')$_m$X$_{4-m}$—TiCl$_4$ (U.S. Pat. No. 4,507,448)

in which R and R' are organic residual groups and X is a halogen atom.

The foregoing vanadium compounds are exemplified by tetra-valent vanadium compounds such as vanadium tetrachloride, vanadium tetrabromide, and vanadium tetraiodide; and penta-valent vanadium compounds such as vanadium oxytrichloride and orthoalkyl vanadate; and tri-valent vanadium compounds such as vanadium trichloride and vanadium triethoxide.

The vanadium compounds can be used singly or in combination with the titanium compounds.

Exemplarey of as other catalysts are the combination of organoaluminum compounds with a solid catalyst component prepared by reacting an organomagnesium compound of the so-called Grignard reagent with a titanium compound and/or a vanadium compound. The organomagnesium compounds are exemplified by the compounds represented by the general formulae: RMgX, R$_2$Mg and RMg(OR), in which R is an organic radical having 1 to 20 carbon atoms and X is a halogen atom, and their ether complexes, and other compounds which are prepared by modifying the above organomagnesium compounds with other organometallic compounds such as organosodium, organolithium, organopotassium, organoboron and organocalcium.

Typical examples of the above catalysts are the compounds prepared by combining an organoaluminum compound with a solid catalyst component such as the RMgX-TiCl$_4$ type, RMgX-phenol-TiCl$_4$ type, RMgX-halogenated phenol-TiCl$_4$ type and RMgX-CO$_2$-TiCl$_4$ type.

Other catalyst systems are exemplified by the combination of an organoaluminum compound with a solid substance which is obtained by reacting an inorganic oxide as a solid catalyst component such as SiO$_2$, Al$_2$O$_3$ and SiO$_2$·Al$_2$O$_3$ with the above-described solid catalyst component containing magnesium and titanium and/or vanadium. Besides the above inorganic oxides of SiO$_2$, Al$_2$O$_3$ and SiO$_2$·Al$_2$O$_3$; CaO, Ba$_2$O$_3$ and SnO$_2$ are also used. Furthermore, the double oxides of the above oxides can also be used. These inorganic oxides are brought into contact with the solid catalyst component containing magnesium and titanium and/or vanadium through a well-known method. More particularly, the reaction is carried out at a temperature in the range of 20 to 400° C., preferably 50 to 300° C., generally for 5 minutes to 20 hours with or without an organic solvent such as an inert hydrocarbon, alcohol, phenol, ether, ketone, ester, amine, nitrile or a mixture of them. The reaction may be carried out by any suitable method such as performing size reduction of all component materials.

Practical examples of the above catalyst systems are the combination of an organoaluminum compound with the solid catalyst components exemplified as follows:

SiO$_2$—ROH—MgCl$_2$—TiCl$_4$ (US Pat. No. 4,315,999),

SiO$_2$—ROR'—MgO—AlCl$_3$—TiCl$_4$ (British Patent. No. 2,099,004),

SiO$_2$—MgCl$_2$—Al(OR)$_3$—TiCl$_4$—Si(OR')$_4$ (US Pat. No. 4,396,534),

SiO$_2$—TiCl$_4$—R$_n$AlCl$_{3-n}$—MgCl$_2$—Al(OR')$_n$Cl$_{3-n}$ (EP-A No. 407143),

SiO$_2$—TiCl$_4$—R$_n$AlX$_{3-n}$—MgCl$_2$—Al(OR")$_n$Cl$_{3-n}$—Si(OR")$_n$Cl$_{4-n}$ (EP-A No. 413469),

SiO$_2$—MgCl$_2$—Al(OR')$_n$Cl$_{3-n}$Ti(OR")$_4$—R$_n$AlCl$_{3-n}$ (EP-A No. 428375)

SiO$_2$—MgC$_2$—Al(OR')$_n$Cl$_{3-n}$—Ti(OR")$_n$Cl$_{4-n}$—R$_n$AlCl$_{3-n}$ (EP-A No. 428375)

SiO$_2$—TiCl$_4$—R$_n$AlCl$_{3-n}$—MgCl$_2$—Al(OR')$_n$Cl$_{3-n}$—R"$_m$Si(OR''')$_n$X$_{4-(m+n)}$ (EP-A No. 493118)

SiO$_2$—R$_n$MgX$_{2-n}$—Al(OR')$_n$Cl$_{3-n}$—Ti(OR")$_n$Cl$_{4-n}$—R'''OH-R$_n$AlX$_{3-n}$ (EP-A No. 507574)

SiO$_2$—MgCl$_2$—Al(OR')$_n$Cl$_{3-n}$—Ti(OR")$_n$Cl$_{4-n}$—R'''OH—R$_n$AlCl$_{3-n}$—Al(OR')$_n$Cl$_{3-n}$ (EP-A No. 500392)

in which R, R', R" and R''' are hydrocarbon residual groups, respectively.

In these catalyst systems, the compounds of titanium and/or vanadium can be used as the adducts of organic carboxylic esters. Furthermore, it is possible to use the foregoing inorganic solid compounds after bringing the compounds into contact with organic carboxylic acid esters. Still further, the organoaluminum compounds can be used as an adduct with an organic carboxylic acid ester. In other words, the catalyst systems which are prepared in the presence of organic carboxylic acid esters can be used.

The organic carboxylic acid esters used herein are exemplified by the esters of aliphatic, alicyclic and aromatic carboxylic acids. Among all, aromatic carboxylic acid esters having 7 to 12 carbon atoms are preferable, which are exemplified by alkyl esters such as methyl ester and ethyl ester of benzoic acid, anisic acid, and toluic acid.

The organoaluminum compounds used together with the above-described solid catalyst components are those having at least one aluminum-carbon bond in the molecule.

For example, they are exemplified by:

(i) organoaluminum compounds represented by the general formula:

R$_m$Al(OR')$_n$H$_p$X$_q$ in which each of R and R' is a hydrocarbon group having 1 to 15 carbon atoms, preferably 1 to 4 carbon atoms such as alkyl, aryl, alkenyl, or cycloalkyl group. The alkyl groups are exemplified by methyl, ethyl, propyl, isopropyl, isobutyl, sec-butyl, tert-butyl, hexyl and octyl groups. R and R' may be either the same or different groups. X is a halogen atom. The symbols m, n, p and q are, respectively, $0<m\leq3$, $0\leq n<3$, $0\leq p<3$, and $0\leq q<3$ as well as $(m+n+p+q)=3$, and (ii) alkylated complexes of a metal of the group I of the periodic table with aluminum which is represented by the general formula:

MAlR$_4$ in which M is a metal selected from the group of Li, Na and K, and R is the same hydrocarbon group as defined above Exemplified as the organoaluminum compounds belonging to the above (i) are:

General formula: R$_m$Al(OR')$_{3-m}$ in which each of R and R' is the same hydrocarbon group as defined above and m is a numeral preferably in the range of $1.5\leq m\leq3$.

General formula: R$_m$AlX$_{3-m}$ in which R is the same hydrocarbon group as defined above, X is a halogen atom and m is a numeral preferably in the range of $0<m<3$.

General formula: R$_m$AlH$_{3-m}$ in which R is the same hydrocarbon group as defined above and m is a numeral preferably in the range of $2\leq m<3$.

General formula: R$_m$Al(OR')$_n$X$_q$ in which R is the same hydrocarbon group as defined above, X is a halogen atom, and each of m, n and q is a numeral preferably in the ranges of $0<m\leq3$, $0\leq n<3$, and $0\leq q<3$ and $(m+n+q)=3$.

The organoaluminum compounds belonging to the group (i) are exemplified by trialkylaluminums such as trimethylaluminum, triethylaluminum, triisopropylaluminum, triisobutylaluminum, tri-sec-butylaluminum, tri-tert-butyl aluminum, trihexylaluminum and trioctylaluminum; trialkenylaluminum; dialkylaluminum alkoxides such as diethylaluminum ethoxide and dibutylaluminum butoxide; alkylaluminum sesquialkoxide such as ethylaluminum sesquiethoxide and butylaluminum sesquibutoxide as well as partially alkoxylated alkylaluminum represented by the average composition of R$_{2.5}$Al(OR)$_{0.5}$; dialkylaluminum halides such as diethylaluminum chloride, dibutylaluminum chloride, and diethylaluminum bromide; partially halogenated alkylaluminums such as ethylaluminum sesquichloride, butylaluminum sesquichloride, ethylaluminum sesquibromide; partially hydrogenated alkylaluminums such as dialkylaluminum hydrides of diethylaluminum hydride and dibutylaluminum hydride and alkylaluminum dihydrides such as ethylaluminum dihydride and propylaluminum dihydride; and partially alkoxylated or halogenated alkylaluminums such as ethylaluminum ethoxychloride, butylaluminum butoxychloride, and ethylaluminum ethoxybromide.

The organoaluminum compounds belonging to the above group (ii) are exemplified by LiAl(C$_2$H$_5$)$_4$ and LiAl(C$_7$H$_{15}$)$_4$.

As the above organoaluminum compounds belonging to the above (i), it is also possible to use the compounds in which two or more aluminum atoms are bonded through oxygen atoms or nitrogen atoms, which compounds are exemplified by (C$_2$H$_5$)$_2$AlOAl(C$_2$H$_5$)$_2$, (C$_4$H$_9$)$_2$AlOAl(C$_4$H$_9$)$_2$, and (C$_2$H$_5$)$_2$AlN(C$_2$H$_5$)Al (C$_2$H$_5$)$_2$.

Among the above-mentioned compounds, trialkylaluminums are most preferable.

The quantity of organoaluminum compound to be used in regular operation is not limited. However, it may be in the range from 0.05 to 1000 moles per 1 mole of titanium compound.

The polymerization according to the present invention is carried out in the like manner as the ordinary polymerization of olefins in the presence of a Ziegler type catalyst. That is, the reaction is substantially carried out under a vapor phase condition. Concerning other polymerization conditions, the temperature is in the range of 10 to 200° C., preferably 40 to 150° C. and the pressure is in the range from the normal pressure to 70 kg/cm$^2$·G, preferably 2 to 60 kg/cm$^2$·G.

The regulation of molecular weight can be attained effectively by adding hydrogen into the polymerization system although it can be done to some extent by changing the polymerization conditions such as temperature, molar ratios of catalysts or else.

Olefins, solid catalyst components and organoaluminum compound are introduced constantly into the reaction system during the regular operation, meanwhile the produced polymer particles are taken out from the polymerization system.

In the polymerization of olefins in a fluidized bed reactor, the reactor is previously fed with the so-called seed polymer of resin particles to start fluidization. The polymerization is then started by continuously feeding the reactor with mixed gases as raw materials, solid catalyst components and an organoaluminum compound as a co-catalyst. Because the catalysts are hardly dispersed, in the case that the seed polymer is not used, granular resin cannot be formed and the fluidized bed cannot be formed either. Accordingly, when the fluidized bed polymerization reactor is used, the seed polymer is inevitably fed into the reactor in the initial stage of polymerization.

Incidentally, the seed polymer used in the present invention which is fed into the reactor prior to the start of polymerization, is not especially limited as far as it can form a fluidized bed or a stirred bed. However, the polyolefin particles, especially those having the same properties as those of the product to be prepared, are preferably used as the seed polymer in general.

The seed polymer used in the present invention preferably has an average particle diameter of 500 to 1500 μm and a bulk density of 0.25 to 0.5 g/cm$^3$. The seed particles of smaller than 500 μm in average particle diameter are not preferable.

The quantity of the seed polymer is not especially limited as long as it can form a fluidized bed or stirred bed.

As described in the above passage, in the initial stage of polymerization, not only the lowering of the bulk density of produced polymer but also the lowering of MFR is caused to occur in addition to formation of sheet-like polymer.

In the period between the start of polymerization and the stage of regular polymerization state, the above extraordinary phenomena occur. One of the causes is considered to be the lowering of the concentration of organoaluminum compound as a co-catalyst near the active center of solid catalyst component. In other words, some impurities remain in the reaction system when it is opened or it is cleaned and the remaining impurities are accumulated in the dead spaces in the system. The accumulated impurities are continuously released to consume the organoaluminum compound and to reduce its concentration.

In the case that solid catalyst components are fed without a sufficient quantity of organoaluminum compound, the solid catalyst components are accumulated near the inside wall of a reactor. Therefore, when the organoaluminum compound is fed after that, the reaction is started near the inside wall of the reactor resulting in the formation of the sheet-like polymer. At the same time, the lowering of the bulk density and MFR of polymer are also caused to occur.

When the organoaluminum compound exists but the quantity thereof is insufficient relative to the quantity of the solid catalyst components, the activity of polymerization is quite unstable. In other words, the polymerization activity is largely varied in proportion to the change of the quantity of the organoaluminum compound relative to the solid catalyst components. Moreover, the largest activity of polymerization is observed in this case. In addition, the polymerization initiates just after the feeding of the solid catalyst components, however, the bulk density of polymer is lowered, the reaction becomes unstable, MFR is also lowered, and the formation of sheet-like polymer is often caused to occur.

When the quantity of organoaluminum compound is large relative to the quantity of solid catalyst components, the polymerization activity is slightly lowered with the increase of the quantity of organoaluminum compound. However, there is no problem in this case. Furthermore, both the degrees of the lowering of bulk density and the lowering of MFR are quite small. In this case, it has been confirmed that the polymerization occurs just after the feed of catalyst. Even though the initial polymerization activity is lower than that of the regular or steady state reaction, neither the lowering of bulk density nor the lowering of MFR of polymer is observed and the sheet-like polymer is not formed after that.

Accordingly, when the quantity of organoaluminum compound is in excess relative to the quantity of solid catalyst components in a reactor at the time to start the feeding of catalyst, the formation of sheet-like polymer can be suppressed. In addition, other extraordinary phenomena in the initial stage of reaction can also be avoided.

As described above, before the start of polymerization, the quantity of the organoaluminum compound to be fed after the feeding of seed polymer is largely dependent upon the quantities of the impurities before the feeding of seed polymer and the impurities contained in seed polymer particles themselves.

Accordingly, when the organoaluminum compound is fed after the feeding of the seed polymer, in order to maintain a sufficient quantity of organoaluminum compound relative to the quantity of solid catalyst components, it is necessary to maintain the polymerization system including gas circulation pipings in the dried state above a certain level before the feeding of seed polymer. The term "dried state" herein referred to means that reaction inhibiting substances in a reactor are eliminated.

The present inventors have found out that the formation of sheet-like polymer, the lowering of bulk density and the lowering of MFR of polymer can be avoided by supplying a reactor with a certain quantity of organoaluminum compound before the feeding of seed polymer into the reactor to maintain the dried state of the reactor above a certain level and then further supplying a reactor with a certain quantity of organoaluminum compound.

It is preferable to dry the inner part of the reaction system prior to the drying with the organoaluminum compound, because the quantity of impurities in the system can easily be suppressed below a certain level. As the measures for this purpose, the drying with heat or with the fuel gas can be done through the following method.

As the gases to be used for the drying, inert gases which do not contain reaction inhibitors such as water, oxygen, carbon dioxide, carbon monoxide, and methanol, can be used. Such inert gases are exemplified by nitrogen, monomers such as ethylene, comonomers such as butene-1, hydrogen and their mixtures. When a gas is used, the drying is carried out at a temperature in the range of 10 to 140 ° C. and a pressure in the range of 0.01 to 3 MPa·G. In the method of drying, a gas is continuously passed through a reaction vessel or a gas may be supplied to cause the inner pressure to be raised and be reduced repeatedly.

The drying using organoaluminum compound is then carried out.

After the above described drying operation, or after the formation of a system of reaction cycle, a gas is circulated within the reaction system and the organoaluminum compound is added to the gas in order to reduce reaction inhibiting substances to a certain level. The kinds, temperature and pressure of circulating gases are the same as the description in the foregoing paragraph. That is, the drying is carried out at a temperature in the range of 10 to 140 ° C. and a pressure in the range of 0.01 to 3 MPa·G. The organoaluminum compound is dissolved in a proper solvent and the solution is introduced into the current of the gas to be entrained in it. The carrier gas may be continuously circulated within the reaction system or it may be supplied into the reactor by repeatedly raising and reducing its pressure. Exemplified as the circulating gases are inert gases such as nitrogen, monomers such as ethylene, comonomers such as butene-1, hydrogen or their mixtures.

The quantity of organoaluminum compound used for the drying is defined by the following equation (I):

$$A = k \cdot V^{2/3} \qquad (I)$$

wherein A is the feed quantity (mol) of organoaluminum compound, k is a coefficient (mol/m$^2$) in the range of 0.15 to 4, and V is the volume (m$^3$) of the whole system including circulating gas circulation pipings.

When the value of k is less than 0.15, the effect to eliminate impurities such as reaction inhibiting substances is insufficient. The preferable minimum value of k is 0.3. Meanwhile, if the value of k is too large, for example, when the value of k is more than 4, it is not preferable in view of economy. When the value of k is relatively large, there is a tendency that the catalytic activity is lowered and the formation of low molecular weight polymer is increased. In view of these facts, the maximum value of k is preferably 1.3.

After the drying, seed polymer particles are introduced in the reaction system according to an ordinary method. After carrying out suitable drying, the polymerization is started by feeding predetermined quantities of solid catalyst components, organoaluminum compound and olefin gases at predetermined feed rates, respectively, thereby causing the regular polymerization to proceed.

In the following, the present invention will be described in more detail with reference to examples and comparative examples. It should be noted, however, that the present invention is by no means restricted to these examples and comparative examples.

EXAMPLE

Preparation Example for Solid Catalyst Components

A 500 ml three-necked flask equipped with a stirrer and a reflux condenser was fed with 50 g of SiO$_2$ which was baked at 600° C., 160 ml of dehydrated hexane and 2.2 ml of titanium tetrachloride. The contents were allowed to react for 3 hours under the refluxing with hexane. After the reaction, the reaction mixture was cooled and 30 ml of diethylaluminum chloride solution in hexane (1 mmol/ml) was added. Reaction was further carried out for 2 hours under the refluxing with hexane and the reaction mixture was dried under reduced pressure at 120° C., to remove the hexane. The thus obtained reaction product is hereinafter referred to as "Component I".

A stainless steel pot of 400 ml in internal volume containing 25 stainless steel balls of 0.5 inch in diameter, was fed with 10 g of commercially available anhydrous magnesium chloride and 4.2 g of aluminum triethoxide. Ball milling was carried out at room temperature for 16 hours in an atmosphere of nitrogen. The thus obtained reaction product is hereinafter referred to as "Component II".

The above Component II (5.4 g) was dissolved into 160 ml of dehydrated ethanol and the whole solution was fed into a three-necked flask containing Component I. Reaction was carried out for 3 hours under the refluxing of ethanol. After that, drying under reduced pressure was then carried out at 150° C. for 6 hours to obtain a solid catalyst component. The content of titanium was 15 mg per 1 g of the obtained solid catalyst component.

The reaction for the preparation of the solid catalyst component was performed in an inert gas atmosphere to avoid the contamination with moisture.

Incidentally, all the Examples and Comparative Examples disclosed herein were carried out independently. The respective experiments were done with proper intervals. More particularly, the polymerization apparatus after each experiment was exposed to the air for gas purging according to predetermined procedures. The start of experiment was done likewise. The methods for preparing catalysts were the same. However, prior to each experiment, only a certain amount of catalyst necessary for the experiment was prepared and it was used for only the relevant experiment.

Examples 1 to 7 and Comparative Examples 1 to 2

Copolymerization of ethylene and butene-1 was started using a fluidized bed reactor system of 85 m$^3$ in volume including gas circulation pipings. The operation until the start of reaction was as follows and the results are shown in the following Tables 1 and 2.

Method for Starting Operation (1) As shown in Tables 1 and 2, the first drying operation was carried out by passing nitrogen gas for one day at 95° C., 0.5 MPa·G and a flow rate of 60 Nm$^3$/h, or mixed gases for one day at 85° C., 2 MPa·G and a vent flow rate of 10 Nm$^3$/h. The composition of the mixed gases was 35 mole % of nitrogen, and the molar ratio of hydrogen/ethylene was 0.15 and that of butene-1/ethylene was 0.4, i.e. 35 mole % of nitrogen, 22.6 mole % of ethylene, 3.4 mole % of hydrogen and 9.0 mole % of butene-1.

(2) As shown in Tables 1 and 2, the second drying was carried out by circulating nitrogen or the mixed gases under the above-described conditions and triethylaluminum (TEA) in the quantities as indicated in Tables 1 and 2 was additionally fed to the reactor.

(3) After the drying, the reactor was cooled and the pressure was lowered and the reactor was maintained in a nitrogen atmosphere.

(4) Two tons of linear low density poly-ethylene particles of 780 μm in average diameter as seed polymer was fed into the reactor.

(5) The pressure of the system was raised with nitrogen to 0.5 MPa·G and the pressure was then released. This operation was repeated three times so as to remove oxygen.

(6) The pressure in the reactor was raised to a reaction pressure with reaction gas. The reaction was then started with continuously feeding TEA and the solid catalyst component containing Ti and Mg as prepared in the foregoing Preparation Example. The rate of feeding the catalyst component was 75 g/h. The weight ratio of TEA to the catalyst component was 0.05 to 5 by weight. The temperature in the reaction system was maintained at 85° C. The composition of vapor phase gases in terms of the ratio of hydrogen/ethylene/butene-1 was maintained at 0.1/1/0.4 and the concentration of nitrogen was made 25 mole %. The total reaction pressure was 1.96 MPa·G.

TABLE 1

| Items | Examples | | | |
| --- | --- | --- | --- | --- |
|  | 1 | 2 | 3 | 4 |
| First Drying Used Gas | Nitrogen | Nitrogen | Mixed gas | Mixed gas |
| Second drying |  |  |  |  |
| Used Gas | Nitrogen | Mixed gas | Nitrogen | Mixed gas |
| TEA (kg) | 1.5 | 1.5 | 1.5 | 1.5 |
| Value k in Equation (I) (mol/m$^2$) | 0.68 | 0.68 | 0.68 | 0.68 |
| State of Operation |  |  |  |  |
| Start of Reaction after Feed of Catalyst | 30 min. | 30 min. | 30 min. | 30 min. |
| Formation of Sheet-like Polymer | None | None | None | None |
| Bulk Density | Normal | Normal | Normal | Normal |
| MFR | Normal | Normal | Normal | Normal |
| Activity of Catalyst | Normal | Normal | Normal | Normal |

| Items | Examples | | |
| --- | --- | --- | --- |
|  | 5 | 6 | 7 |
| First Drying Used Gas | Nitrogen | Not used | Nitrogen |
| Second drying |  |  |  |
| Used Gas | Nitrogen | Nitrogen | Nitrogen |
| TEA (kg) | 1.5 | 1.5 | 4 |
| Value k in Equation (I) (mol/m$^2$) | 0.68 | 0.68 | 1.82 |
| State of Operation |  |  |  |
| Start of Reaction after Feed of Catalyst | 30 min. | 30 min. | 30 min. |
| Formation of Sheet-like Polymer | None | None | None |
| Bulk Density | Normal | Normal | Normal |
| MFR | Normal | Normal | Normal |
| Activity of Catalyst | Normal | Normal | Lowered |

TABLE 2

| Items | Comparative Examples | |
| --- | --- | --- |
|  | 1 | 2 |
| First Drying Used Gas | Nitrogen | Nitrogen |
| Second drying |  |  |
| Used Gas | Mixed gas | Nitrogen |
| TEA (kg) | 0.25 | 0 |
| Value k in Equation (I) (mol/m$^2$) | 0.11 | 0 |
| State of Operation |  |  |
| Start of Reaction after Feed of Catalyst | 30 min. | 6 hours |
| Sheet-like Polymer | Formed | Formed(*) |
| Bulk Density | Lowered | — |
| MFR | Lowered | — |
| Activity of Catalyst | Raised | — |

(*)After the formation of sheet-like polymer, the condition to discharge polymer particles was not good and the operation was stopped.

In the polymerization of olefins using a vapor phase fluidized bed, according to the present invention, it is possible to reduce the formation of sheet-like polymer in the initial stage of the polymerization by previously drying the polymerization system with feeding a certain quantity of an organoaluminum compound prior to the feeding of seed polymer, thereby avoiding the lowering of the bulk density and MFR value of the polymer product.

What is claimed is:

1. In a method for polymerizing or copolymerizing olefins under a vapor phase condition by feeding a reaction vessel with a catalyst comprising an organoaluminum compound and solid catalyst components containing one or both of titanium and vanadium, and magnesium, the improvement in a method for drying a vapor phase polymerization system which is characterized in that said drying is carried out by feeding an organoaluminum compound in a quantity as defined by the equation (I) into the whole polymerization system including said reaction vessel and circulating gas circulation pipings before seed polymer particles are fed into said reaction vessel, $$A = k \cdot V^{2/3} \quad (I)$$

wherein A is the feed quantity (mol) of the organoaluminum compound, k is a coefficient (mol/m$^2$) in the range from 0.15 to 4, and V is the volume (m$^3$) of the whole polymerization system including circulating gas circulation pipings.

2. The method for drying a vapor phase polymerization system as claimed in claim 1, wherein said organoaluminum compound is an alkylaluminum.

3. The method for drying a vapor phase polymerization system as claimed in claim 1, wherein said coefficient k is a value in the range of 0.3 to 1.3.

4. The method for drying a vapor phase polymerization system as claimed in claim 1, wherein said olefin has 2 to 8 carbon atoms.

5. The method for drying a vapor phase polymerization system as claimed in claim 1, wherein said drying is carried out at a temperature in the range of 10° to 140° C. and a pressure in the range of 0.01 to 3 MPa·G.

6. The method for drying a vapor phase polymerization system as claimed in claim 4, wherein said olefin is at least one member selected from the group consisting of ethylene, propylene, butene-1, pentene-1, hexene-1, and 4-methylpentene-1.

7. The method for drying a vapor phase polymerization system as claimed in claim 2, wherein said alkyl aluminum is at least one member selected from the groups consisting of:

$R_mAl(OR')_{3-m}$ in which each of R and R' is a hydrocarbon group having 1 to 15 carbon atoms and R and R' can be either the same or different and m is a numeral in the range of $1.5 \leq m \leq 3$;

$R_mAlX_{3-m}$ in which R is a hydrocarbon group as defined above, X is a halogen atom, and m is a numeral in the range of $0 < m < 3$;

$R_mAlH_{3-m}$ in which R is a hydrocarbon group as defined above, and m is a numeral in the range of $2 \leq m < 3$; and $R_mAl(OR')_nX_q$ in which each of R and R' is a hydrocarbon group as defined above, X is a halogen atom, and each of m, n and q is a numeral in the ranges of $0 < m \leq 3$, $0 \leq n < 3$, $0 \leq q < 3$, and $(m+n+q)=3$.

8. The method for drying a vapor phase polymerization system as claimed in claim 1, wherein said organoaluminum compound is an alkylated complex of a metal of the group I of the periodic table with aluminum which is represented by the general formula:

$MAlR_4$ in which M is a metal selected from the group of Li, Na and K and R is a hydrocarbon having 1 to 15 carbon atoms.

9. The method as claimed in claim 7 wherein said hydrocarbon group is an alkyl, aryl, alkenyl or cycloalkyl group.

10. The method as claimed in claim 8 wherein said hydrocarbon group is an alkyl, aryl, alkenyl or cycloalkyl group.

* * * * *